Feb. 24, 1948. T. P. SIMPSON 2,436,780
METHOD FOR HANDLING A CONTACT MASS
Filed June 17, 1942 3 Sheets-Sheet 2
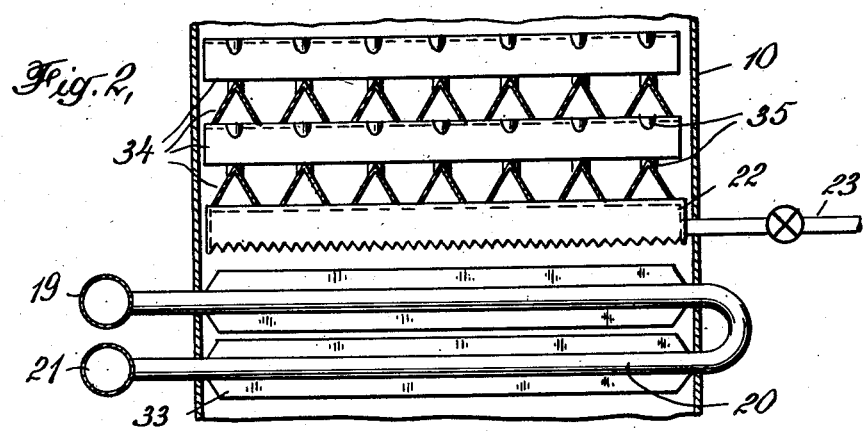
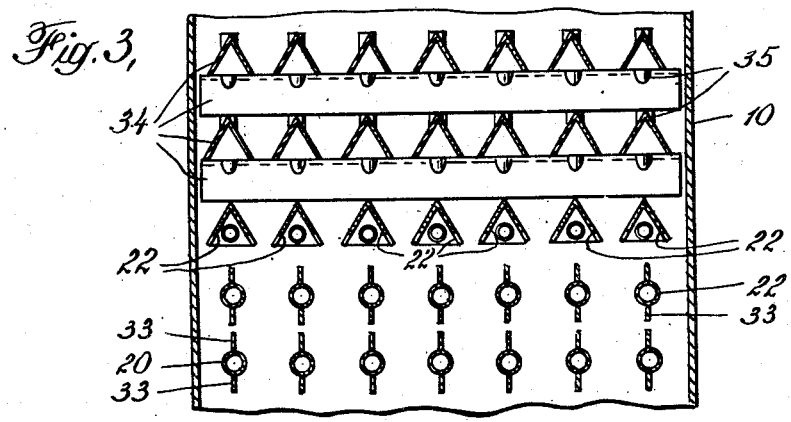
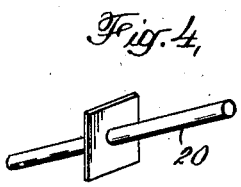
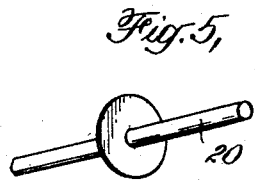
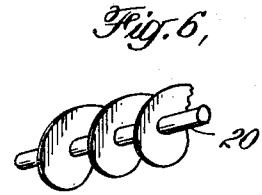
Thomas P. Simpson,
INVENTOR
BY
ATTORNEY Feb. 24, 1948.   T. P. SIMPSON   2,436,780
METHOD FOR HANDLING A CONTACT MASS
Filed June 17, 1942   3 Sheets-Sheet 3
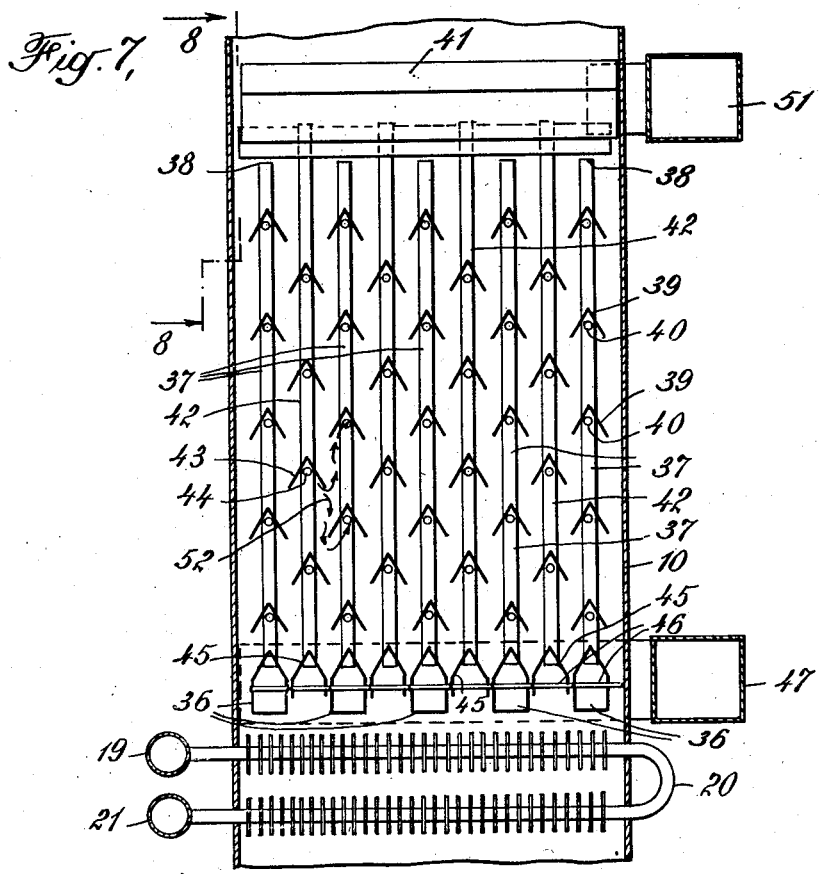
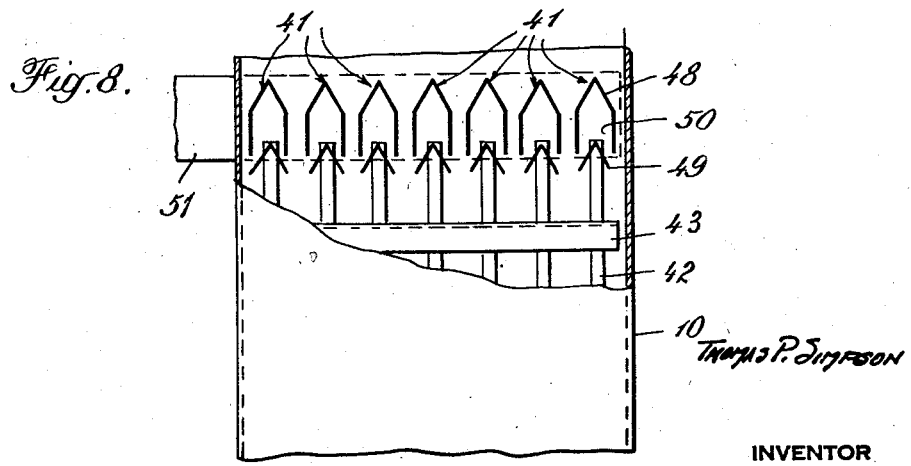
INVENTOR
Thomas P. Simpson
BY
ATTORNEY Patented Feb. 24, 1948

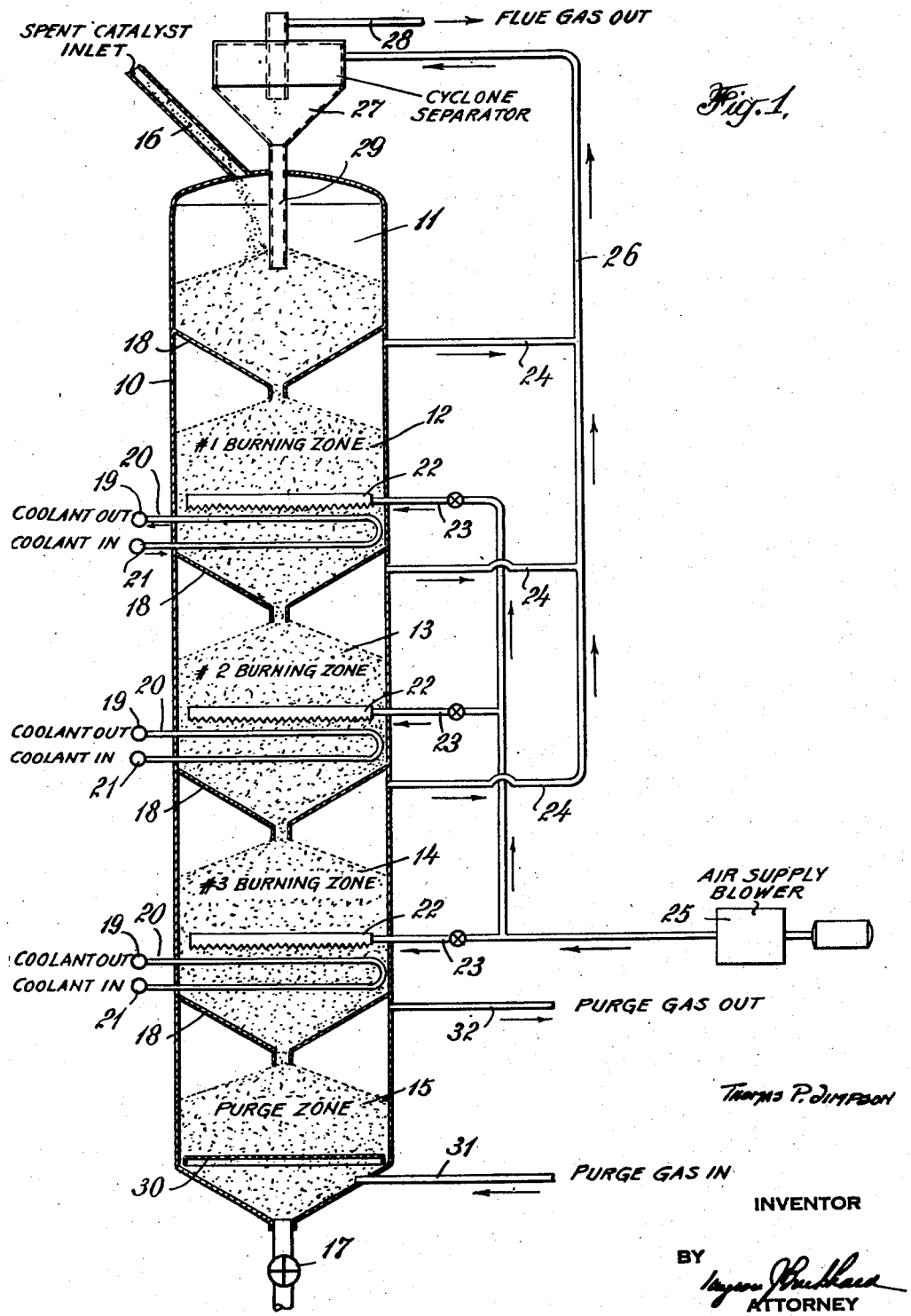

2,436,780

UNITED STATES PATENT OFFICE 2,436,780

METHOD FOR HANDLING A CONTACT MASS

Thomas P. Simpson, Woodbury, N. J., assignor to Socony-Vacuum Oil Company, Incorporated, a corporation of New York Application June 17, 1942, Serial No. 447,433

7 Claims. (Cl. 252—242)

This invention has to do with methods for the contacting of solid materials in granular form or pellet form with gases or other fluids for the accomplishment of reactions involving such solid materials and the gases or vapors. Such operations are normally conducted in the burning of carbonaceous residues from spent adsorbents used in filtration or other clarification and decolorizing operations, for the accomplishment of conversion of hydrocarbon vapors in the presence of a contact mass in particle form, for the accomplishment of other conversions of gaseous or vapor material in the presence of similar contact masses, for the regeneration of spent contact mass materials from such conversion operations as are above mentioned, by burning deposited products of reaction from the contact mass and for a large variety of similar purposes. One specific form of operation with which this invention is concerned is the conduct of operations of this general class which are exothermic or endothermic in nature and which, for one reason or another, require some measure of temperature control during the reaction.

A highly exemplary form of this type of reaction is the burning of carbonaceous deposits from adsorbent materials previously used in filtration and similar decolorizing operations and, more particularly, the regeneration by burning of spent contact mass materials previously utilized in the vapor phase conversion of hydrocarbons. In the bulk of the discussion of this invention which follows, attention will be directed specifically to the treatment of a granular adsorbent refractory contact mass of the general nature of clay which is being regenerated by burning after having been spent in accomplishing a vapor phase conversion of hydrocarbons in which carbonaceous material was deposited upon the adsorbent. It will be understood, however, that the restriction of the description to this particular operation is by way of example only and that the invention is not to be considered as limited thereto or thereby.

It is well known in the art that hydrocarbons in vapor form may be cracked or otherwise converted by exposure at temperatures of around 850° F. or higher to contact masses partaking generally of the nature of an alumina-silica complex. It is also well known that such contact masses, when deprived of conversion activity by the deposit thereon of combustible carbonaceous materials, usually spoken of as coke, may be regenerated by the burning off of such deposits. It is also well known that adsorbent materials of this nature suffer deterioration in activity if exposed to temperatures that are too elevated during such regeneration. In general, it may be assumed that such contact mass materials should not be heated above about 1100° F.

This invention has for its object the provision of a method of reaction of this general type wherein the reaction is divided into stages without heat control within the stage, with a controlled small amount of the reaction occurring within each stage and with heat control accomplished after each stage. It has as an important object the provision of a method capable of securing a greater degree of control upon the rate of reaction, a greater degree of control upon the intensity of reaction, a greater degree of control upon the completeness of reaction, and a greater control of the temperature characteristics of the reaction.

The method with which this invention is concerned may be carried forth in an apparatus which may be described as a multi-stage kiln. In this multi-stage kiln the regeneration operations spoken of above as an example of a reaction requiring heat control would be accomplished by burning and cooling in alternate steps. Thus, a multi-stage kiln will consist of a number of burning and cooling stages placed alternately in series. Each burning stage will have a separate air supply and means for disposing of waste gases. No heat transfer surface is provided in the burning stage and the maximum temperature of each burning stage is restricted by limiting the amount of air supplied to the stage. After each burning stage, the material being treated is so cooled that it will not be raised above a desired maximum temperature during the burning desired to be accomplished in the next stage. An operation requiring endothermic heat control would be similarly handled, with heat supply instead of heat removal. The multi-stage kiln designs disclosed hereinafter are the subject of application Serial Number 596,650, filed in the United States Patent Office, May 30, 1945 (now abandoned), said application being a true division of this application.

As an example of the exothermic type of operation, we may consider the regeneration of a spent clay contact mass entering the first stage of a multi-stage kiln at a temperature of 850° F. It will be supplied therein with sufficient air to accomplish a combustion which will raise the maximum temperature to not above 1100° F. The clay, at 1100° F., would then pass into a cooling stage, which can be any suitable type of heat exchanger, where it will be cooled to 850° F. before entering the next burning stage. Thus, we have alternate cooling and burning rather than simultaneous cooling and burning.

Step-wise burning in this manner has a number of advantages. First, it permits induction of a fresh air supply into the system at a number of points, without dilution from flue gases. Second, splitting the flow of air gives lower air velocities and pressure drops through each stage, as compared with a single stage burner where the entire air supply enters at one place. With multi-stage kilns, by employing a sufficient number of stages, the air rates and pressure drops through each stage will be low enough to permit direct passage of the air through the granular mass being regenerated (for example with catalyst masses in the range of 4 to 30 mesh size), without providing special baffles or ducts. Third, by employing a separate heat exchanger between burning zones, the cooling fluid can be employed at a lower temperature than can be tolerated in the burning zone of types of kiln where substantially simultaneous burning and heat transfer are practiced.

This last-named advantage is of very considerable importance. Use of low temperature coolant fluids increases the mean temperature difference (M. T. D.) between the hot mass and the coolant and thus permits a large reduction in the heat transfer surface required for a given duty. For example, with an adequate supply of cool water, such as river water or cooling tower water, and assuming it was not necessary or advantageous to recover waste heat, then an M. T. D. of 800° to 900° F. could be employed. In this case, the heat exchange surface requirements would be much less than that needed in operations where high temperature coolants are employed. On the other hand, if recovery of heat was desirable, water at 300° to 500° F. could be used under pressure and an M. T. D. of 400° to 600° F. would be obtained, still obtaining a large reduction in heat transfer surface over that required with high temperature coolants.

The advantage of using lower temperature coolants is of great importance from a practical point of view. For example, the use of water at 300–500° F. as a coolant permits maintenance of a proper heat balance and recovery of valuable heat energy in useful form by flashing of the heated water to produce saturated steam under pressure. Likewise, the choice of low temperature coolants is much broader than those suitable for high temperature use in the range of 750° to 1000° F. Water, oil, diphenyl, steam, molten metal, mercury, molten salts and various other liquids, vapors and gases would be suitable as heat transfer agents.

One means of maintaining a heat balance in a multi-stage regenerating system under varying heat loads is by changing the M. T. D. of the coolant with respect to the burning mass. Another is to add or subtract stages within the limits of capacity of the system. Another would be by varying the rate of coolant circulation. Another is by varying the volume and/or temperature of the air passed through the various stages.

It will be appreciated that these considerations, with the reversal of the direction of heat flow, apply equally well to reactions requiring endothermic heat.

This invention will be readily understood by references to the drawings attached to this specification in which Figure 1 shows a rather simple form of multi-stage kiln; Figures 2 to 6 inclusive, show certain details which may be used therein, or in diagrammatic form; and Figures 7 and 8 show a more advanced design of kiln, likewise in diagram form.

Turning now to Figure 1, we find that the multi-stage kiln consists of a shell 10, divided by partitions into zones 11, 12, 13, 14 and 15, equipped with a spent catalyst inlet 16, and a regenerated catalyst outlet 17. Each of the zones aforementioned is separated from the others by a funnel-shaped partition 18. Zone 11 is a feed zone. Zone 15 is a purge zone, as will be later described.

Intermediate zones 12, 13 and 14 are burning zones. In each of these burning zones, just above that partition 18 which defines the lower end of said zone, there is installed a heat exchanger consisting of a header 19, from which tubes 20 proceed into and through the zone, returning to header 21. Just above this heat exchanger, there is installed an air distributor 22, which is later described in greater detail, to which air is supplied by valved pipe 23. At the top of the zone, in the free space below the upper funnel-shaped partition 18, there is provided an air take-off pipe 24. Air, for the operation, is supplied by blower 25. The flue gases collected from the burning by the pipes 24, pass through pipe 26 into a cyclone separator or other dust-collecting device 27 and out of the system by pipe 28. Fines collected in the dust separator 27 are returned to treatment by being conducted to feed zone 11 through pipe 29 or removed from the system, if desired, through passages not shown.

Turning now to purge zone 15, we find that a solid bed of material being treated is maintained therein by a partial obstruction 30 which may also serve as a distributing means for a purge gas such as steam, which may be brought in through pipe 31 and discharged through pipe 32. Turning again to the distributor 22, this may be formed conveniently of a series of inverted metal troughs distributed across the area of the reactor, just above the heat exchange means, with a pipe whereby air may be introduced beneath each trough to pass out under the depending edges thereof, which may be either plain or serrated, as shown. It will be noted that in this form of apparatus, the air is passed broadcast through the catalyst bed. This is permissible with moderately shallow beds and with catalysts of such size, for example, 10–30 mesh, as to present a sufficient percentage of void space to permit the passage of air therethrough at reasonable rates without causing excessive turbulence or disruption of the catalyst bed.

The operation of catalyst outlet valve 17 serves to control the flow of material through the reactor, acting as a metering device to maintain levels throughout the apparatus and prevent complete drainage of contact mass therefrom. Obviously this function may be performed by any competent outflow control device.

With smaller sizes of material, or under conditions where still lower pressure drops must be had, or where conditions of operation dictate a continuous redistribution of air, the construction shown in Figures 2 and 3 is frequently resorted to. Figures 2 and 3 are two views in section, taken at right angles to each other, of the heat exchanger and bottom portion of a single stage of a multistage kiln of the general type with which we are concerned. In Figures 2 and 3, reading them together, 10 is the shell of the kiln, 19 and 21 are the heat exchange medium headers and 20 are the tubes of the heat exchanger shown here as having vertical fins 33. Above the heat exchanger is air distributor 22, supplied by pipe 23 and above that there are shown 4 layers of inverted angle irons 34, each layer disposed at right angles to the other as shown in order that the catalyst and air may be alternately mixed and separated as they flow countercurrently through the various layers of angle irons. In many circumstances it may be advisable to provide each angle iron with an orifice at that point where it passes under the angle iron next above, as shown at 35.

The heat exchanger tubes 20, in any of the various modifications in multistage kiln, will usually be finned to provide greater external heat transfer surface. These fins may taken any form which does not materially impede or alter the flow of granular material in a direction transverse to the tubes. Several forms of fins are shown isometrically in Figures 4, 5 and 6, 4 being a vertical square fin, 5 a vertical circular fin and 6, a helical fin.

A more highly developed form of multi-stage kiln which might aptly be described as a stage-in-stage or stage-in-group kiln is shown in Figure 7, of which Figure 8 is an explanatory detail taken at right angles to Figure 7 near the top of that figure. In Figure 7, there is shown only one burning and cooling stage, that is, the equivalent of any of the stages 12, 13 or 14 of Figure 1. In Figure 7, we find 10 representing the shell of the kiln, cooling medium headers 19 and 21 and finned cooling pipes 20 as before. Immediately above these cooling pipes we find a series of air inlet boxes 36 which have the form in cross section of a gable roofed box. Extending upwardly from each of these boxes 36, there are tubes 37 which extend through the burning zone and are terminated by a closed end 38 at the tops thereof. A series of such pipes, mounted one behind the other, upon each box and consequently not visible in Figure 7, will be disposed at intervals along the ridge of each box 36, across that dimension of the kiln which is vertical to the plane of view shown in Figure 7. Spaced vertically along these pipes 37, there are distributor channels 39 in the form of inverted angular channels placed horizontally and transversely of the reaction chamber. Each pipe 37 is supplied with an orifice 40, located under each distributor channel. At the top of the stage, there is a series of air collector boxes 41, described in greater detail hereinafter. Depending from these air collector boxes, between and alternately spaced with air distributor pipes 37, there is a series of air collector pipes 42, each air collector pipe 42 is supplied with air collector channels 43, under which there are orifices 44, the construction at this point on the air collector tubes being similar to that on the air distributor pipes. These air collector pipes are arranged in series along that dimension of the kiln which is vertical to the plane view of Figure 7 in exactly the same manner as are the air distributor pipes. The air collector pipes terminate at the bottom in an air collector channel 45, one of which is placed between each pair of air distributor boxes 36. These bottom channels 45 are open at their bottom end and are provided at intervals along their length with a transverse stiffener 46 which serves both to preserve the shape of the channel and to extend outwardly from its sides for a short distance to maintain spacing between channels 45 and boxes 36. It will be noted that the vertical spacing of the air collector troughs 43 along their pipes is such that they alternate vertically with air distributor troughs 39. Air distributor boxes 36 connect with passages through the wall of the kiln and communicate externally thereof with the air supply main 47. Returning to the upper end of the stage in this type of construction and turning to Figure 8, we find that the air collector pipes at their upper end are open into a series of air collector boxes 41, each of which is seen to consist of an open bottomed gabled roof box 48, within which at the bottom there is supported a trough member 49 in which the air collector pipes terminate, the trough 49 being so assembled in box 48 to leave upon each side a slot 50. Each of the boxes 41 connects with a passage through the wall of the kiln and communicates externally with a flue gas main 51.

In operation, the clay or other granular material flows down through the kiln between the boxes 41 along, around and between the pipes 42 and 37 through the passages between boxes 36 and troughs 45 and thence downward around the cooling medium pipes. This flowing granular material is so handled that the kiln is maintained full and the material moves as a solid moving column completely filling the kiln in the portion shown in these figures except for the void spaces under the troughs 39, 43 and 45. Air or other gas or vapor with which the solid material is to be treated or which is to be reacted in the presence of a solid material, enters the system through a supply pipe 47 and goes thence into air distributor boxes 36 and passes from thence upwardly through air distributor pipes 37 from whence it passes outwardly through orifices 40 into the space under channels 39 and then outwardly into the flowing solid material. As shown by arrows, at 52 in Figure 7, after passing both downwardly and upwardly through the flowing solid material, it collects under the air collector channels 43, passes through orifices 44 into air collector pipes 42, thence upwardly into air collector boxes 41 and out through duct 51. The troughs 45 upon the bottom of each series of air collector pipes serve exactly the same purposes as do those air collector channels 43 at higher points upon the air collector pipes 42. They are shaped, however, to additionally form members so related to the series of boxes 36, as to provide a proper grid work of passages for flowing solid material at the bottom of the burning stage. Referring to Figure 8, wherein it was pointed out that slots 50 were left between members 48 and 49 which composed each box 41, these slots 50 are provided to remove adventitious solid material from boxes 41.

It is noted that in the above discussion the terms "air," "air distributor," "air collector," etc., are used for convenience in referring to the functions of the various apparatus and for purposes of nomenclature. It will be understood, of course, that operation is not restricted to air by the use of these terms, but that any gasiform reagent or reactant will be similarly handled.

It will be noted that in a kiln composed of several stages, such as that shown in Figure 7, that the air collector boxes 41 at the top and the combination of air distributor boxes 36 and troughs 45 at the bottom, form a rather effective distributing grid for the flowing solid material and effectively bring about its uniform distribution throughout the kiln. It will also be noted that in any kiln making use of several such stages, that the joint effect of the air collector boxes 41 and the cooling section area containing coils 20 which in a multisection kiln would lie just above them, establishes a rather solidly packed body of the moving solid which serves to isolate the burning stage below each cooling coil from the burning stage immediately above.

All of these designs have one feature in common, namely, controlled diffusion of reactant gas into the solid material. In all, there is an upper limit on the amount of gas which can be forced into the reaction chamber, which is that amount of gas which can be forced through the solid material without causing "boiling" of the solid material which would upset its proper passage downwardly, induce channelling, and have other serious drawbacks.

In solid columns of great depth, the pressure drop for a given flow of air is quite high. In a highly permeable angle-packed type of design, such as Figures 2 and 3, the pressure drop for a given depth of clay column is quite low. In the first, it is quite difficult at reasonable pressure drops to secure air rates giving desired reactions. In the second, due to the low pressure drop, diffusion of gaseous reactants into the solid material is difficult to obtain. In operation, as shown in Figures 1 and 7, both diffusion and low pressure drop may be maintained by proper balance of design. The design shown by Figure 7 is particularly of interest in that extremely high gas rates and high diffusion may be coupled with reasonable pressure drops.

All of the designs shown herein are directed to the accomplishment of a single method of operation. They are directed to the accomplishment of a method of operation wherein a carbonaceous deposit may be removed or other exothermic reaction may be accomplished in relatively small stages, each, without the interference of simultaneous cooling, and after each of which cooling may be applied to correct and control the exothermic reaction. They are directed as well to operations requiring similar control of endothermic heat of reaction. It will be obvious that this method of operation is of wide applicability.

The word "granular" as employed herein in claiming this invention is intended to distinguish from powdered solids and is intended to cover pellets, spheres and solid pieces of other shapes.

I claim:

1. The process of regenerating a granular form solid which has been used as a hydrocarbon conversion catalyst and is contaminated by a carbonaceous deposit resulting from such use which comprises passing said solid as a substantially compact mass of downwardly gravitating solid granules, through a plurality of burning zones, passing said solid through a heat exchange zone intermediate each two successive burning zones, passing in direct contact with said solid in each of said burning zones only a controlled amount of preheated air, withdrawing resulting regeneration gases from each burning zone and discarding said regeneration gases while excluding the flow of said regeneration gases from one burning zone into another, and passing a fluid heat exchange medium in indirect heat exchange relationship with said solid in each of said heat exchange zones, substantially in the absence of air flow through said solid.

2. The process of regenerating a granular solid adsorbent contaminated by a carbonaceous deposit which comprises: passing said adsorbent at a temperature at least sufficiently high for combustion of said carbonaceous contaminant, through a series of alternating burning zones and cooling zones through each of which it flows as a substantially compact column of gravitating solid granules, introducing combustion supporting gas independently into each of said burning zones at controlled rates, passing said gas through the column of adsorbent in said burning zones to effect contaminant combustion and withdrawing gaseous regeneration products from each of said burning zones, substantially excluding the flow of said gaseous products from one burning zone to another, and cooling said adsorbent in each of said cooling zones in substantial absence of said combustion gas flow.

3. The process for regeneration of granular adsorbents which have become spent by deposition of a carbonaceous deposit thereon and which exist at a temperature suitable for initiating combustion of said deposit which process comprises passing said granular solid downwardly through a plurality of burning zones through each of which it moves as a substantially compact mass of gravitating granular adsorbent, similarly passing said granular adsorbent through a heat exchange zone intermediate each two successive burning zones, passing an oxygen containing gas in direct contact with said granular adsorbent in each of said burning zones to burn off from said adsorbent a portion of said deposit in each burning zone, effecting a separation of the gaseous regeneration products formed in each burning zone from the granular adsorbent before any substantial amount of said gaseous products formed in any given one of said burning zones passes into any other of said burning zones and cooling said granular adsorbent in each of said heat exchange zones.

4. The process of regenerating a granular solid which has been used as a hydrocarbon conversion catalyst and is contaminated by a carbonaceous deposit resulting from such use which comprises passing said solid at a temperature suitable for combustion of said carbonaceous deposit as a substantially compact continuous column of gravitating granules of solid material downwardly through a series of alternating burning and heat exchange zones, introducing a combustion supporting gas into said column independently at a series of levels along its length corresponding to said burning zones to contact said solid and to effect combustion of part of said deposit thereon, effecting a disengagement of the resulting regeneration gases from said column of granular solid at another series of levels along said column intermediate said first named levels so located that the regeneration gases resulting from the combustion in any given burning zone does not enter any of the remainder of said burning zones, discarding the regeneration gases so disengaged, and cooling said solid in each of said heat exchange zones.

5. The process of regenerating a granular adsorbent solid contaminated by a carbonaceous deposit which comprises: passing said solid at a temperature at least high enough for initiating combustion of said carbonaceous deposit through a vertical series of alternating burning and cooling zones as a substantially compact column of gravity flowing solid granules while substantially excluding gas flow with the solid flow between zones, independently introducing only a separate portion of air into each of said burning zones, passing said air in contact with said column of granules in the absence of heat removal by indirect heat transfer in each of said burning zones, withdrawing the gaseous regeneration products from each of said burning zones, discarding the gaseous regeneration products withdrawn from each of said burning zones after its flow through only the burning zone from which it is withdrawn, and passing a fluid heat exchange medium in indirect heat exchange relationship with said solid in each of said heat exchange zones.

6. The process of regenerating a spent granular contact mass material contaminated with combustible deposit which comprises: passing said contact material at a temperature suitable for combustion of said combustible deposit through a series of alternating burning and cooling zones through each of which it passes as a substantially compact column of gravitating solid particles, separately introducing into each of said burning zones a controlled amount of oxidizing gas sufficient to support the burning of a predetermined small portion of said combustible deposit, which is less than that which would raise the temperature of the contact material to a heat damaging level, withdrawing gaseous regeneration products from each of said burning zones and discarding the gaseous products from each burning zone without permitting them to flow through any other burning zone, and cooling said contact material by indirect heat exchange with a suitable cooling fluid in each of said cooling zones.

7. That process of conducting the regeneration of a granular adsorbent bearing carbonaceous contaminant deposits by the burning off of said deposits from the adsorbent which comprises: moving the granular adsorbent as a substantially solidly packed column of gravitating granules successively through a contacting with a selected portion of an oxygen containing gas in the absence of heat removal by indirect heat transfer to accomplish contaminant combustion to an extent insufficient to cause the adsorbent to be heated to a heat damaging temperature, then through a cooling by indirect heat transfer with a suitable cooling fluid, and repeating the process independently with a different portion of oxygen containing gas until the whole of the desired regeneration is accomplished while substantially excluding the gaseous regeneration products resulting from any of said contactings from any other of said contactings.

THOMAS P. SIMPSON.

REFERENCES CITED

The following references are of record in the file of this patent:

UNITED STATES PATENTS

| Number | Name | Date |
| --- | --- | --- |
| 2,401,739 | Johnson | June 11, 1946 |
| 2,344,449 | Orgorzaly | Mar. 14, 1944 |
| 2,331,433 | Simpson et al. | Oct. 12, 1943 |
| 2,320,562 | Bransky | June 1, 1943 |
| 2,320,273 | Gohr et al. | May 25, 1943 |
| 2,311,984 | Guild | Feb. 23, 1943 |
| 2,306,011 | Burk et al. | Dec. 22, 1942 |
| 2,240,347 | Page et al. | Apr. 29, 1941 |
| 2,159,140 | Eckell et al. | May 23, 1939 |
| 1,836,301 | Bechtold | Dec. 15, 1931 |
| 1,685,338 | Randolph | Sept. 25, 1928 |
| 1,394,269 | Bourdet | Oct. 18, 1921 |
| 1,155,402 | Bornmann | Oct. 5, 1915 |